United States Patent
Wang et al.

(10) Patent No.: US 11,824,412 B2
(45) Date of Patent: Nov. 21, 2023

(54) DISC-TYPE IRONLESS PERMANENT MAGNET SYNCHRONOUS GENERATOR POWERED BY AUXILIARY POWER SUPPLY

(71) Applicants: Xiaoguang Wang, Wuhan (CN); Renwei Yu, Wuhan (CN)

(72) Inventors: Xiaoguang Wang, Wuhan (CN); Renwei Yu, Wuhan (CN)

( * ) Notice: Subject to any disclaimer, the term of this patent is extended or adjusted under 35 U.S.C. 154(b) by 0 days.

(21) Appl. No.: 18/172,184

(22) Filed: Feb. 21, 2023

(65) Prior Publication Data

US 2023/0198327 A1    Jun. 22, 2023

Related U.S. Application Data

(63) Continuation of application No. PCT/CN2021/076392, filed on Feb. 9, 2021.

(51) Int. Cl.
| H02K 3/20 | (2006.01) |
| H02K 3/47 | (2006.01) |
| H02K 21/24 | (2006.01) |
| H02K 21/48 | (2006.01) |

(52) U.S. Cl.
CPC ............ *H02K 3/20* (2013.01); *H02K 3/47* (2013.01); *H02K 21/24* (2013.01); *H02K 21/48* (2013.01); *H02K 2213/03* (2013.01)

(58) Field of Classification Search
CPC .... H02K 1/182; H02K 1/2793; H02K 1/2795; H02K 1/2796; H02K 1/2798; H02K 3/16; H02K 3/20; H02K 3/47; H02K 16/02; H02K 16/04; H02K 21/24

See application file for complete search history.

(56) References Cited

U.S. PATENT DOCUMENTS

| 4,634,912 A | * | 1/1987 | Heyraud | H02K 23/54 310/198 |
| 2005/0029890 A1 | * | 2/2005 | Kadoya | H02K 21/48 310/180 |
| 2010/0072850 A1 | * | 3/2010 | Miyata | H02K 16/02 310/156.12 |
| 2015/0349598 A1 | | 12/2015 | Gieras et al. | |
| 2022/0263388 A1 | * | 8/2022 | Shaw | H02K 3/26 |

FOREIGN PATENT DOCUMENTS

| CN | 101459365 A | 6/2009 |
| CN | 202004590 U | 10/2011 |
| CN | 204652188 U | 9/2015 |
| CN | 110365148 A | 10/2019 |

OTHER PUBLICATIONS

Internation Search Report of PCT/CN2021/076392, dated Oct. 26, 2021.

* cited by examiner

*Primary Examiner* — Eric Johnson

(57) ABSTRACT

Provided is a disc-type ironless permanent magnet synchronous generator powered by an auxiliary power supply, which comprises a stator coil disc and a pair of permanent magnet rotor discs (1) positioned on two sides of the stator coil disc and arranged with a gap therebetween, a circle of main coils (3) are fixedly arranged on the stator coil disc around a center of the disc, the main coil is a main winding of an electric motor to output electric energy, an auxiliary winding independent from the main winding is arranged on a circumference formed by the main coils (3) in a surrounding manner, and output power of the auxiliary winding is less than output power of the main winding.

3 Claims, 2 Drawing Sheets

DISC-TYPE IRONLESS PERMANENT MAGNET SYNCHRONOUS GENERATOR POWERED BY AUXILIARY POWER SUPPLY

TECHNICAL FIELD

The present invention relates to the technical field of generators, and particularly to a disc-type ironless permanent magnet synchronous generator.

BACKGROUD OF THE PRESENT INVENTION

At present, generators are generally divided into a single-phase generator, a three-phase generator and other multi-phase generators. The characteristic of output voltages of existing generators is that the frequency, voltage amplitude and waveform of output voltage of each phase are all equal, and the voltages are symmetrical with each other in phase. With the development of generator technology, a traditional generator winding structure is difficult to meet the needs of power supply control, and a plurality of power supplies are needed in some power supply occasions. In addition to a main power supply with a higher voltage, one or more auxiliary power supplies with a lower voltage are also needed to output electric energy, and all these power supplies need a generator to output. In a traditional generator, the above power supply requirements cannot be met, or a certain phase of an output power supply of a multi-phase generator is designed as the auxiliary power supply, which will lead to the decrease of output power of the generator, the decrease of space utilization of the generator and the sharp decrease of the power density.

SUMMARY OF PRESENT INVENTION

The technical problem to be solved by the present invention is to meet output requirements of a plurality of different voltages of a generator, and a new generator topological structure is needed, which not only meets the output requirements of the plurality of different voltages, but also makes full use of a space of the generator to improve a power density of the generator, thereby providing a disc-type ironless permanent magnet synchronous generator powered by an auxiliary power supply.

The disc-type ironless permanent magnet synchronous generator powered by the auxiliary power supply comprises a stator coil disc and a pair of permanent magnet rotor discs positioned on two sides of the stator coil disc and arranged with a gap therebetween, the stator coil disc is coaxial with the permanent magnet rotor disc, a circle of main coils are fixedly arranged on the stator coil disc around a center of the disc, and the main coil is a main winding of an generator to output electric energy, wherein an auxiliary winding independent from the main winding is arranged on a circumference formed by the main coils in a surrounding manner, and output power of the auxiliary winding is less than output power of the main winding.

More preferably, the auxiliary winding is provided with a plurality of independent auxiliary coils, and each auxiliary coil is composed of an independent coil.

A number of the auxiliary coils is greater than or equal to 1 and less than or equal to 3m, wherein m is a number of phases of the generator, and the main coil and the auxiliary coil form an unevenly distributed circumference.

As an embodiment, the main winding is divided into multiple phases, which are distributed in a central symmetry relative to the center of the stator coil disc, and on the same layer of winding disc, the auxiliary coil is separately arranged between coils of different phases of the main winding.

A sum of pitches occupied by the main coils is greater than a sum of pitches occupied by the auxiliary coils; the pitch of the main coil is expressed as: $y1=[(360-(A+B)\times \alpha1)-A\times y2]/B$, wherein $y1$ represents the pitch of the main coil, expressed in degrees, A represents a number of the auxiliary coils, B represents a number of the main coils, $\alpha1$ represents an angle occupied by an interval between adjacent coils, $y2$ represents the pitch of the auxiliary coil, expressed in degrees, and a value of $y2$ ranges from 1 to $360/B$.

As an embodiment, a plurality of auxiliary coils are used separately, or the plurality of auxiliary coils are connected into a loop. That is, two or more auxiliary coils are combined into one loop.

A sum of total power of the auxiliary coils is less than total power of the main coils.

Further, the sum of the total power of the auxiliary coils is less than one third of the total power of the main coils.

The present invention provides a new generator topological structure, which breaks through a traditional concept that the disc-type generator is only provided with the main coil. Through a reasonable design of a stator winding structure of the generator, the stator winding of the generator can reasonably output two sets of different power supplies, one set is the main power supply and outputs a high-power power supply to meet a power requirement of a load on a power supply system; and the other set is the auxiliary power supply and outputs a low-voltage and low-power power supply to meet power requirements of auxiliary equipment and a control system. The power density of the disc-type generator is maintained, and the output power of the auxiliary power supply is fully utilized, which not only meets output requirements of a plurality of different voltages, but also makes full use of a space of the generator.

Figure 1:
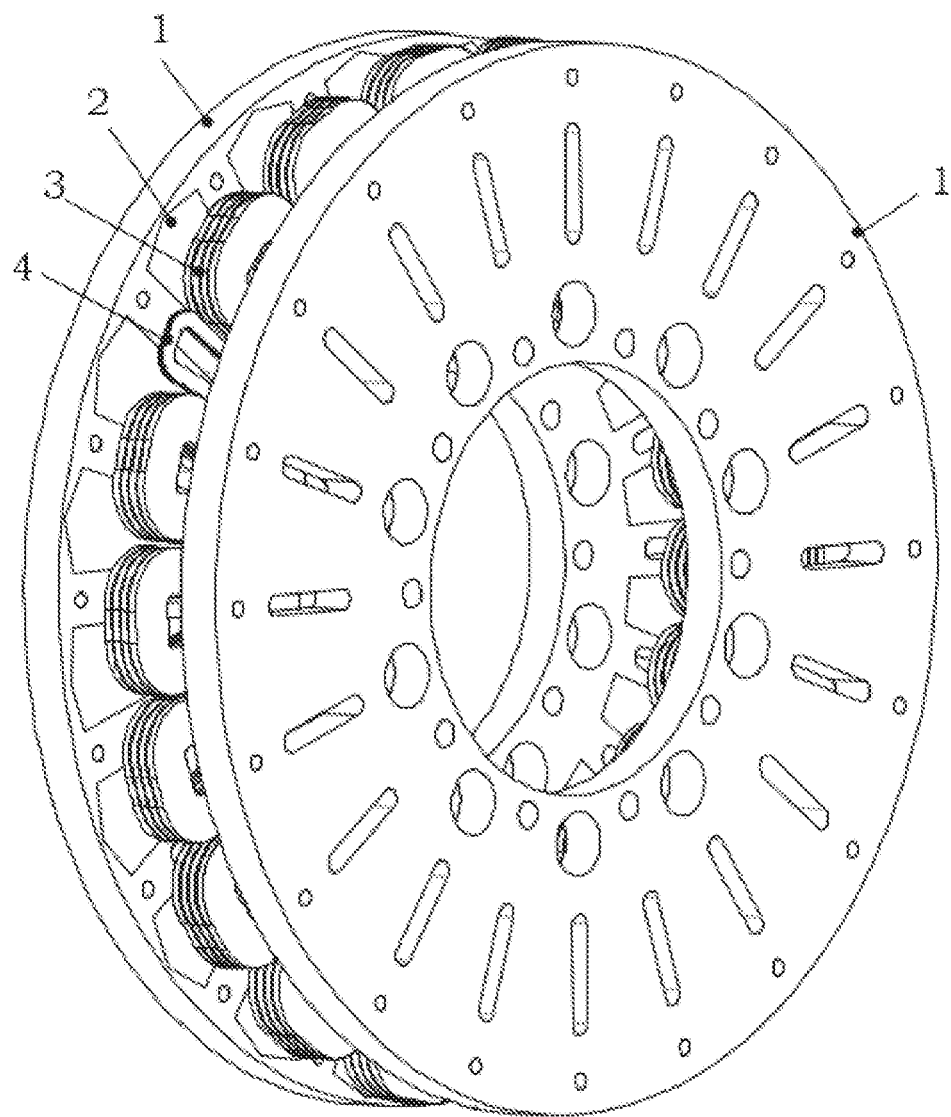
FIG. 1 is a perspective view of a topological structure of an embodiment of a generator according to the present invention.

In the drawings, 1 refers to permanent magnet rotor disc, 2 refers to permanent magnet, 3 refers to main coil, and 4 refers to auxiliary coil.

DETAILED DESCRIPTION OF PREFERRED EMBODIMENTS

Figure 2:
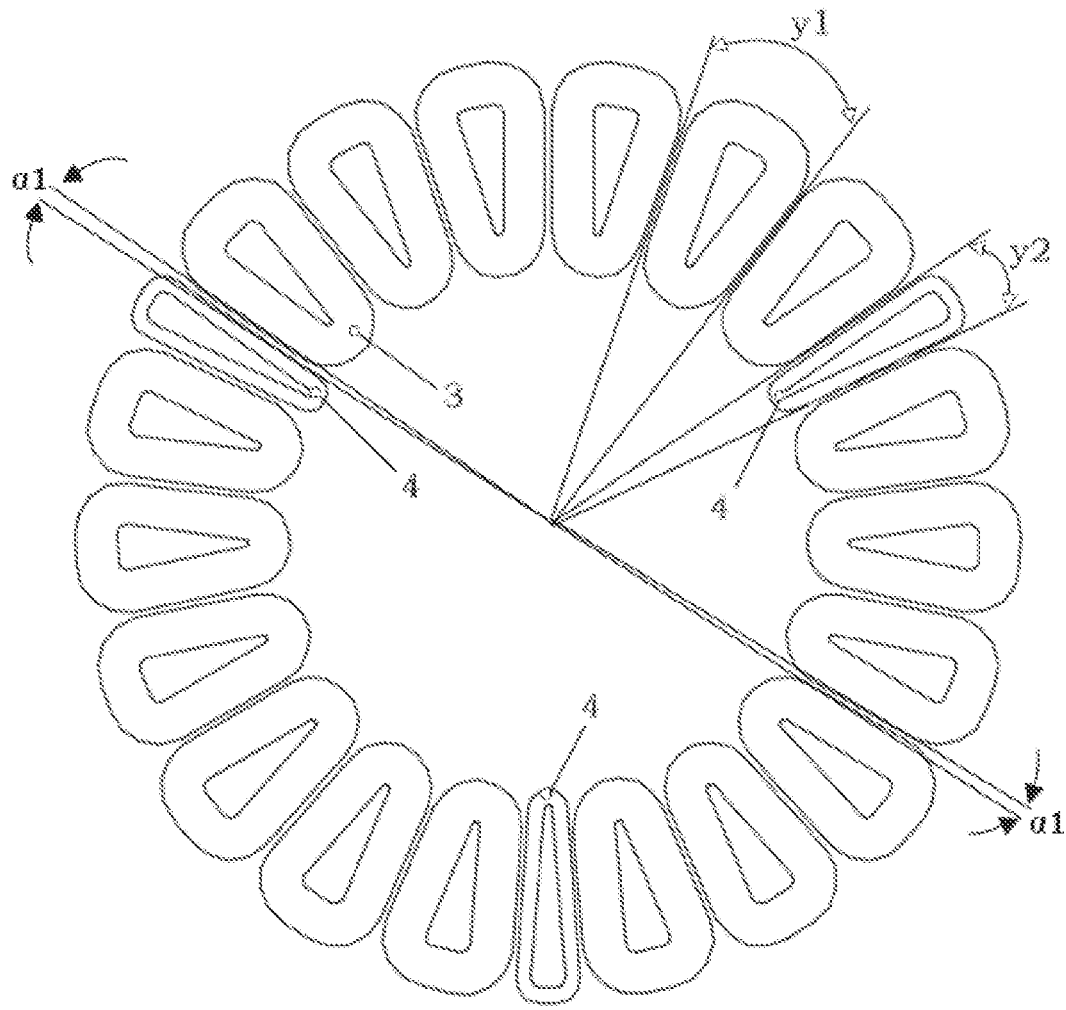
FIG. 2 is a schematic structural diagram of an embodiment of a stator coil winding of the generator according to the present invention.

As shown in FIG. 1 and FIG. 2, an embodiment provided by the present invention is described by taking an axial ironless three-phase permanent magnet disc-type generator with 18 main coils of three phases and 20 pairs of magnetic poles as an example.

The disc-type ironless permanent magnet synchronous generator powered by the auxiliary power supply comprises a coaxial stator coil disc and a pair of permanent magnet rotor discs 1 positioned on two sides of the stator coil disc and arranged with a gap therebetween. The pair of permanent magnet rotor discs 1 are respectively provided with a circle of permanent magnets 2 of the same number fixedly arranged around a center of the permanent magnet rotor disc, the permanent magnets 2 on the pair of permanent magnet rotor discs 1 are axially aligned in pairs, and a pair of aligned magnetic poles are arranged in the same direction, which is a common structure of the disc-type generator.

A circle of main coils 3 are fixedly arranged on the stator coil disc around the center of the disc, the main coil 3 is a main winding of a generator to output electric energy, an auxiliary winding independent from the main winding is arranged on a circumference on which the main coils 3 are located, and output power of the auxiliary winding is less than output power of the main winding. Therefore, a wire diameter, an output voltage, and coil volume and shape of the auxiliary winding are all different from those of the main winding, the auxiliary winding may be a single auxiliary coil 4 or a plurality of auxiliary coils 4, and each auxiliary winding may usually be composed of an independent coil.

For a multi-phase output auxiliary winding, a sum of total power of the auxiliary coils 4 is less than total power of the main coils. Further, the sum of the total power of the auxiliary coils 4 is less than one third of the total power of the main coils. The auxiliary coil usually supplies power to a control system of the generator itself, and only needs low power to output.

It is impossible for symmetrical distribution of a single auxiliary coil, and if there are a plurality of auxiliary coils, the auxiliary coils may or may not be centrally symmetrically distributed relative to the center of the stator disc. Since the main coil and the auxiliary coil have different physical parameters, the main coil and the auxiliary coil form an unevenly distributed circumference.

Specifically, a number of the auxiliary coils is greater than or equal to 1 and less than or equal to 3m, wherein m is a number of phases of the main winding of the generator. A three-phase generator may be provided with 1 to 9 auxiliary coils, and a four-phase generator may be provided with 1 to 12 auxiliary coils. The main coil of each phase is composed of a plurality of coils, and a number of the auxiliary coils is less than that of the main coil. It is inappropriate to arrange too many auxiliary coils, so as to prevent occupying too much space of the main coil, which can greatly reduce a winding coefficient of the main coil, thereby affecting power supply power of the main power supply.

In FIG. 2, as an embodiment, the main winding is divided into three phases. When designing the stator winding, it is necessary to ensure that three-phase voltages of the main power supply are spatially deviated from each other by an electrical angle of 120 degrees, and the three-phase voltages are balanced. The three-phase winding constitutes the main winding which is centrally symmetrical relative to the center of the disc.

The auxiliary coils are separately distributed between coils of different phases of the main winding. The plurality of auxiliary coils may be combined and connected in series and parallel with each other to output, or output independently. The plurality of independent auxiliary coils may have flexible and variable output settings as needed.

Positions occupied by the auxiliary coils may be standardized as follows: a sum of pitches occupied by the main coils is greater than a sum of pitches occupied by the auxiliary coils. The pitch of the main coil is expressed as:

$$y1=[(360-(A+B)\times\alpha1)-A\times y2]/B.$$

Wherein, $y1$ represents the pitch of the main coil, expressed in degrees, $A$ represents a number of the auxiliary coils, $B$ represents a number of the main coils, $\alpha1$ represents an angle occupied by an interval between adjacent coils, $y2$ represents the pitch of the auxiliary coil, expressed in degrees, and a value of $y2$ ranges from 1 to $360/B$. This expression shows that the main coil and the auxiliary coil have different pitches, and the main coil and the auxiliary coil respectively keep a consistent pitch. For example, the main winding in the drawings is 18 coil slots of three phases and is provided with three auxiliary coils, and the above formula may be expressed as:

$$y1=[(360-21\times\alpha1)-3\times y2]/18.$$

The stator winding coil of the generator is formed by winding an enameled wire. Preferably, in order to enhance the insulation of the winding of the generator, the wound coil is processed by a paint dipping technology. Preferably, in order to enhance a mechanical property of the stator of the generator, the processed coil is placed on a non-magnetic stator frame, and the coil is reliably fixed on the stator frame by using an adhesive. The non-magnetic stator frame should have good insulation, mechanical toughness and mechanical strength.

Compared with the prior art, the generator of the present invention may output a plurality of electric energies of multiple voltage levels. Compared with a generator with a traditional structure, the present invention is added with several low-voltage power supplies under a condition of slightly reducing power of an output power supply, which may provide low-power electric energy for auxiliary equipment of a system, without occupying output of the main coil of one phase, thereby avoiding the imbalance of output power and the reduction of output efficiency caused by occupying the main coil.

We claim:

1. An axial-flux coreless permanent magnet synchronous generator, comprising a stator coil disk and two permanent magnet rotor disks (1) positioned on either side of the stator coil disk and arranged with a gap therebetween, the stator coil disk being coaxial with the permanent magnet rotor disks (1), a plurality of main coils (3) being secured on the stator coil disk concentrically around a center of the stator coil disk in spaced relation to each other, and the plurality of main coils being a main winding of the axial-flux coreless permanent magnet synchronous generator;

wherein an auxiliary winding independent from the main winding is arranged on a circumference formed by the plurality of main coils (3) concentrically around the center of the stator coil disk, and output power of the auxiliary winding is less than output power of the main winding;

wherein the auxiliary winding is provided with one or more independent auxiliary coils (4), and each auxiliary coil is composed of an independent coil;

wherein the main winding is divided into multiple phases, which are distributed in a central symmetry relative to the center of the stator coil disk, and on the same layer of the stator coil disk, each of the one or more auxiliary coils (4) is separately arranged between coils of different phases of the main winding;

wherein the sum of the total power of the auxiliary coils is less than one third of the total power of the main coils;

wherein a sum of pitches occupied by the main coils is greater than a sum of pitches occupied by the auxiliary coils; the pitch of the main coil is expressed as: $y1=[(360-(A+B)\times\alpha1)-A\times y2]/B$, wherein $y1$ represents the pitch of the main coil, expressed in degrees, $A$ represents a number of the auxiliary coils, $B$ represents a number of the main coils, $\alpha1$ represents an angle occupied by an interval between adjacent coils, $y2$ represents the pitch of the auxiliary coil, expressed in degrees and a value of y2 ranges from 1 to 360/B.

2. The axial-flux coreless permanent magnet synchronous generator according to claim 1, wherein a number of the auxiliary coils (4) is greater than or equal to 1 and less than or equal to 3m, wherein m is a number of phases of the axial-flux coreless permanent magnet synchronous generator, and the main coil and the auxiliary coil form an unevenly distributed circumference.

3. The axial-flux coreless permanent magnet synchronous generator according to claim 1, wherein a plurality of auxiliary coils are used separately, or the plurality of auxiliary coils are connected into a loop.

* * * * *